US011688393B2

(12) United States Patent
Medalion et al.

(10) Patent No.: US 11,688,393 B2
(45) Date of Patent: Jun. 27, 2023

(54) MACHINE LEARNING TO PROPOSE ACTIONS IN RESPONSE TO NATURAL LANGUAGE QUESTIONS

(71) Applicant: Intuit Inc., Mountain View, CA (US)

(72) Inventors: Shlomi Medalion, Lod (IL); Alexander Zhicharevich, Hod Hasharon (IL); Yair Horesh, Kfar Sava (IL); Oren Sar Shalom, Nes Ziona (IL); Elik Sror, Hod Hasharon (IL); Adi Shalev, Herzliya (IL)

(73) Assignee: INTUIT INC, Mountain View, CA (US)

( * ) Notice: Subject to any disclaimer, the term of this patent is extended or adjusted under 35 U.S.C. 154(b) by 0 days.

(21) Appl. No.: 17/565,717

(22) Filed: Dec. 30, 2021

(65) Prior Publication Data

US 2022/0172712 A1    Jun. 2, 2022

Related U.S. Application Data

(62) Division of application No. 16/805,660, filed on Feb. 28, 2020, now Pat. No. 11,257,486.

(51) Int. Cl.
*G10L 15/18* (2013.01)
*G06N 3/08* (2023.01)
(Continued)

(52) U.S. Cl.
CPC .......... *G10L 15/1815* (2013.01); *G06N 3/045* (2023.01); *G06N 3/08* (2013.01);
(Continued)

(58) Field of Classification Search
CPC ... G10L 15/1815; G10L 15/063; G10L 15/16; G10L 15/197; G10L 15/22; G10L 2015/223; G06N 3/0454; G06N 3/08
See application file for complete search history.

(56) References Cited

U.S. PATENT DOCUMENTS 8,453,058 B1 * 5/2013 Coccaro ................. G06Q 50/01
715/728
8,605,885 B1 * 12/2013 Woofers .................. H04M 3/51
704/255
(Continued)

FOREIGN PATENT DOCUMENTS

CN    109614471 A * 4/2019 .......... G06F 40/289

OTHER PUBLICATIONS

Henderson et al. Efficient Natural Language Response Suggestion for Smart Reply, (arXiv) May 2017 (Year: 2017).*
(Continued)

*Primary Examiner* — Bhavesh M Mehta
*Assistant Examiner* — Darioush Agahi
(74) *Attorney, Agent, or Firm* — Ferguson Braswell Fraser Kubasta PC

(57) ABSTRACT

A method including embedding, by a trained issue MLM (machine learning model), a new natural language issue statement into an issue vector. An inner product of the issue vector with an actions matrix is calculated. The actions matrix includes centroid-vectors calculated using a clustering method from a second output of a trained action MLM which embedded prior actions expressed in natural language action statements taken as a result of prior natural issue statements. Calculating the inner product results in probabilities associated with the prior actions. Each of the probabilities represents a corresponding estimate that a corresponding prior action is relevant to the issue vector. A list of proposed actions relevant to the issue vector is generated by comparing the probabilities to a threshold value and selecting a subset of the prior actions with corresponding probabilities above the threshold. The list of proposed actions is transmitted to a user device.

20 Claims, 10 Drawing Sheets

(51) Int. Cl.
  *G10L 15/16* (2006.01)
  *G10L 15/06* (2013.01)
  *G10L 15/197* (2013.01)
  *G10L 15/22* (2006.01)
  *G06N 3/045* (2023.01)

(52) U.S. Cl.
  CPC ............ *G10L 15/063* (2013.01); *G10L 15/16* (2013.01); *G10L 15/197* (2013.01); *G10L 15/22* (2013.01); *G10L 2015/223* (2013.01)

(56) References Cited

U.S. PATENT DOCUMENTS

| | | | |
|---|---|---|---|
| 9,715,497 B1* | 7/2017 | Bhadbhade | G06F 40/284 |
| 10,498,888 B1* | 12/2019 | Rute | G06F 40/216 |
| 2007/0219798 A1* | 9/2007 | Wang | G10L 15/063 |
| | | | 704/257 |
| 2011/0296374 A1* | 12/2011 | Wu | G06F 40/216 |
| | | | 717/104 |
| 2015/0066504 A1* | 3/2015 | Iannone | G10L 15/04 |
| | | | 704/235 |
| 2015/0370780 A1* | 12/2015 | Wang | G06F 40/129 |
| | | | 704/9 |
| 2019/0019197 A1* | 1/2019 | Roberts | G06N 3/04 |
| 2019/0065594 A1 | 2/2019 | Lytkin et al. | |
| 2019/0140995 A1* | 5/2019 | Roller | G06F 40/295 |
| 2019/0303535 A1 | 10/2019 | Fokoue-Nkoutche et al. | |
| 2020/0349321 A1* | 11/2020 | Pasad | G06F 40/146 |
| 2021/0004437 A1 | 1/2021 | Zhang et al. | |
| 2021/0103925 A1 | 4/2021 | Dev et al. | |
| 2021/0319907 A1 | 10/2021 | Harley et al. | |
| 2021/0326675 A1 | 10/2021 | Oh et al. | |
| 2022/0238098 A1* | 7/2022 | Fu | G06N 3/084 |
| 2022/0328064 A1* | 10/2022 | Shriberg | A61B 5/4803 |

OTHER PUBLICATIONS

Jain et al. An approach to text classification using dimensionality reduction and combination of classifiers, IEEE conference Nov. 2004 (Year: 2004).*

CN-109614471-A-translation (Year: 2018).*

* cited by examiner

| Natural Language Issue Statement | Natural Language Action Statement | Customer-Rating |
|---|---|---|
| So I just want to verify whether I am or whether I'm being charged. So we want to cancel that. And his credit card is being charged for the fee. | Checked customer billing information and cancelled the account | ★★★★☆ |
| Um, I need to see how I can print our report on on, um, on WonderApp online of all my expenses. | Walked customer through printing the report | ★★★★☆ |
| And I have been coming across an issue when trying to attach an attachment to invoices lately. And I wondered if this is some kind of issue that's going on with WonderApp or whether there's something I'm doing wrong. An error occurred while trying to rename a file in the destiny directory. And we've never had the issue before. | Had customer to create a new invoice, and try to attach a file | ★☆ |

FIG. 7

| Natural Language Issue Statement ⟵ 700 | Natural Language Action Statement ⟵ 702 | Sample Label ⟵ 800 | Reason ⟵ 802 |
|---|---|---|---|
| So I just want to verify whether I am or whether I'm being charged. So we want to cancel that. And his credit card is being charged for the fee. | Checked customer billing information and cancelled the account | Positive<br>800A | Match + High Rating<br>802A |
| Um, I need to see how I can print our report on on, um, on WonderApp online of all my expenses. | Sent a customer a password reset link | Negative<br>800B | Don't Match<br>802B |
| And I have been coming across an issue when trying to attach an attachment to invoices lately. And I wondered if this is some kind of issue that's going on with WonderApp or whether there's something I'm doing wrong. An error occurred while trying to rename a file in the destiny directory. And we've never had the issue before. | Had customer to create a new invoice, and try to attach a file | Negative<br>800C | Low Rating<br>802C |

FIG. 8

MACHINE LEARNING TO PROPOSE ACTIONS IN RESPONSE TO NATURAL LANGUAGE QUESTIONS

RELATED APPLICATION

This application is a divisional application of U.S. patent application Ser. No. 16/805,660, filed Feb. 28, 2020, now U.S. Pat. No. 11,257,486, the entirety of which is hereby incorporated by reference.

BACKGROUND

Call center representatives for large commercial organizations often answer calls from customers looking for solutions to problems that the user (e.g., customers) encounter with the commercial organizations' products (e.g., such as software). While most of the problems are common to many customers, the solutions proposed by the call center representatives may vary. Additionally, some problems that are rarely encountered may be difficult to solve by inexperienced customer service representatives.

SUMMARY

The one or more embodiments also provide for a method of using a trained issue machine learning model (MLM). The method includes embedding, by the trained issue MLM, a new natural language issue statement into an issue vector. The method also includes calculating an inner product of the issue vector with an actions matrix. The actions matrix includes centroid-vectors calculated using a clustering method from a second output of a trained action MLM which embedded prior actions expressed in natural language action statements taken as a result of prior natural issue statements. Calculating the inner product results in probabilities associated with the prior actions. Each of the probabilities represents a corresponding estimate that a corresponding prior action is relevant to the issue vector. The method also includes generating a list of proposed actions relevant to the issue vector by comparing the probabilities to a threshold value and selecting a subset of the prior actions with corresponding probabilities above the threshold. The method also includes transmitting, to a user device, the list of proposed actions.

The one or more embodiments also provide for a system. The system includes a data repository. The data repository stores a new natural language issue statement. The data repository also stores a trained issue machine learning model (MLM). The data repository also stores an issue vector including an embedded version of the new natural language issue statement. The data repository also stores an actions matrix including centroid-vectors calculated using a clustering method from a second output of a trained action MLM applied to prior actions taken as a result of prior natural language issue statements. The data repository also stores probabilities associated with the prior actions. Each of the probabilities represents a corresponding estimate that a corresponding prior action is relevant to the issue vector. The data repository also stores a threshold value. The data repository also stores a subset of the prior actions having probabilities above the threshold. The data repository also stores a list of proposed actions relevant to the issue vector. The system also includes a machine learning execution engine. The machine learning execution engine is configured to embed, by the trained issue MLM, the new natural language issue statement into the issue vector. The machine learning execution engine is also configured to calculate an inner product of the issue vector and the actions matrix to form the probabilities. The system also includes an action selection engine executable by a processor to compare the probabilities to the threshold value. The action selection engine is also configured to select the subset of the prior actions with corresponding probabilities above the threshold. Selecting the subset forms a list of proposed actions. The action selection engine is also configured to transmit the list of proposed actions to a user device.

The one or more embodiments also provide for a system. The system includes a data repository. The data repository stores a new natural language issue statement. The data repository also stores a trained issue machine learning model (MLM). The data repository also stores an issue vector including an embedded version of the new natural language issue statement. The data repository also stores an actions matrix including centroid-vectors calculated using a clustering method from a second output of a trained action MLM applied to prior actions taken as a result of prior natural language issue statements. The data repository also stores probabilities associated with the prior actions. Each of the probabilities represents a corresponding estimate that a corresponding prior action is relevant to the issue vector. The data repository also stores a threshold value. The data repository also stores a subset of the prior actions having probabilities above the threshold. The data repository also stores a list of proposed actions relevant to the issue vector. The system also includes a machine learning execution engine. The machine learning execution engine is configured to embed, by the trained issue MLM, the new natural language issue statement into the issue vector. The machine learning execution engine is also configured to calculate an inner product of the issue vector and the actions matrix to form the probabilities. The system also includes an action selection engine executable by a processor to compare the probabilities to the threshold value. The action selection engine is also configured to select the subset of the prior actions with corresponding probabilities above the threshold. Selecting the subset forms a list of proposed actions. The action selection engine is also configured to transmit the list of proposed actions to a user device.

Other aspects of the invention will be apparent from the following description and the appended claims.

BRIEF DESCRIPTION OF DRAWINGS

FIG. 7 and FIG. 8 show examples of data useable to train a machine learning model, in accordance with one or more embodiments of the invention.

DETAILED DESCRIPTION

Figure 1:
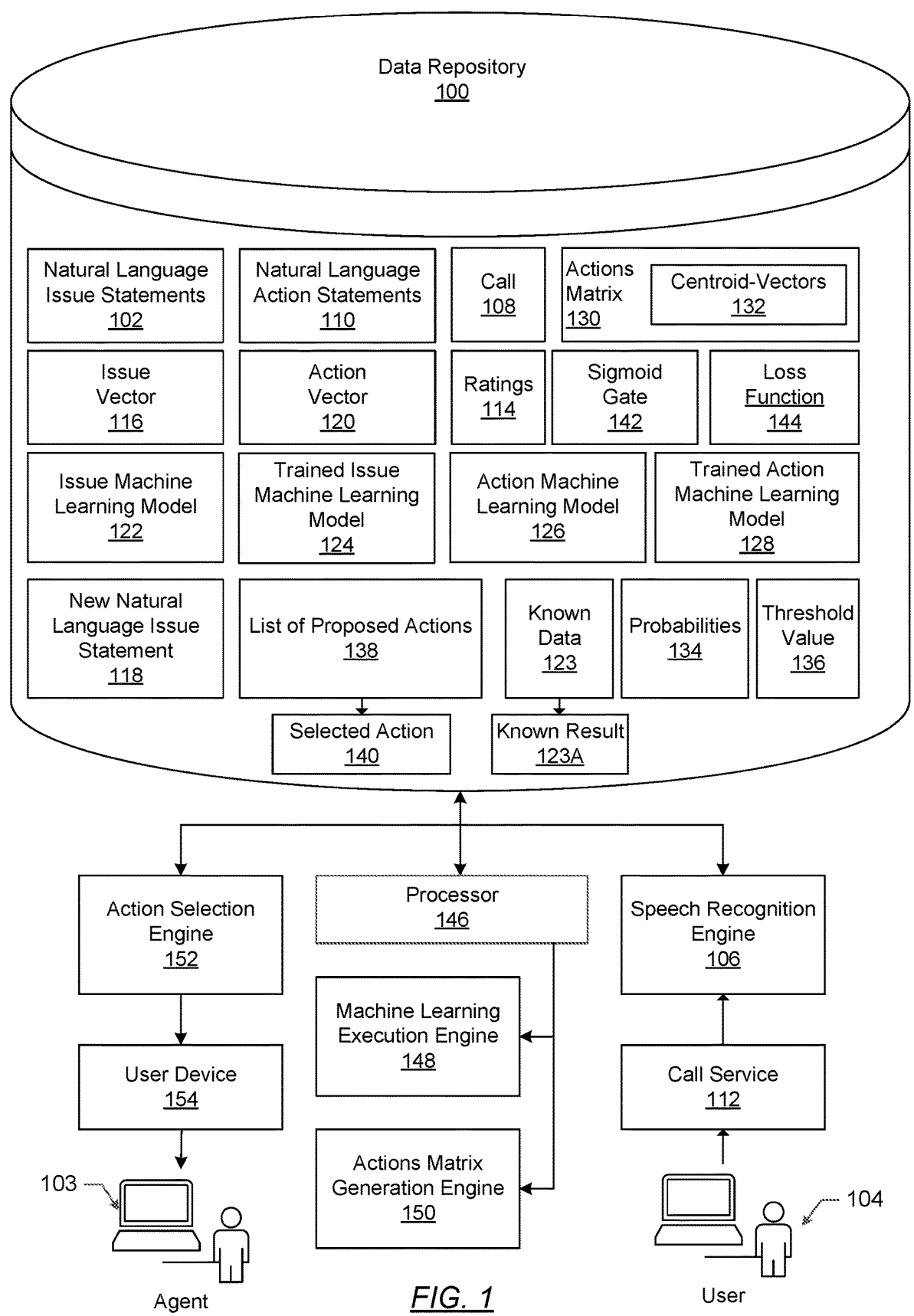
FIG. 1 a shows a computing system, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to training and using machine learning models to automatically provide, to customer service representatives, suggested solutions to problems encountered by users (e.g., customers) of the product (e.g., software). The problems may be described more broadly as "issue statements" or "issues," as not all issues raised by customers are necessarily "problems." Additionally, the tasks performed by the customer service representatives may be described more broadly as "action statements" or "actions," as not all suggestions provided by customer service representatives are necessarily "solutions."

Nevertheless, machine learning together with aggregated call center transcripts are used as the basis for finding the set of action statements most likely to successfully and reliably address a user's issue statement. Stated differently, the one or more embodiments automatically provide, using machine learning technology, customer service representatives with a list of action statements which were associated with high satisfaction ratings from prior users, who previously had called with issues similar to the current user's issue.

The machine learning-generated list of proposed actions increase the reliability and consistency of customer service representative responses. The machine learning-generated list of proposed actions also may aid less experienced customer service representatives in handling rarer or more difficult issues encountered by the customers.

Both the training and the use of the machine learning models used to generate the list of proposed actions are described below.

Attention is now turned to the figures, and in particular to FIG. 1. In one or more embodiments of the invention, the data repository (100) is any type of storage unit and/or device (e.g., a file system, database, collection of tables, or any other storage mechanism) for storing data. Further, the data repository (100) may include multiple different storage units and/or devices. The multiple different storage units and/or devices may or may not be of the same type or located at the same physical site.

The data repository (100) stores a variety of data and software used in the course of training and using the machine learning models of the one or more embodiments. For example, the data repository (100) stores natural language issue statements (102). The natural language issue statements (102) are natural language text that describes issues described by users, such as the user (104).

While the natural language issue statements (102) may be derived from a variety of sources, such as text typed by the user (104), in some embodiments the natural language issue statements (102) are transcribed voice recordings transcribed by a speech recognition engine (106) when the user (104) places a call (108) to the customer service center using a call service (112). The speech recognition engine (106) may be software programmed to receive audio signals received via the call service (112), and convert the audio signals into natural language text. The call service (112) may be a land line telephone service, voice over Internet protocol (VOIP) service, a mobile phone service, or any other service suitable for facilitating voice communications over a distance.

The data repository (100) also stores natural language action statements (110). The natural language action statements (110) are natural language text that describes actions taken by customer service representatives, such as agent (103), to resolve issues raised by customers in the natural language issue statements (102). Each of the natural language action statements (110) may be associated with ratings (114). The ratings are numerical representations of customer satisfactions with the action taken as described by the natural language action statements (110). For example, a customer may have rated, as five stars, an action taken by a customer service representative to resolve the customer's issue. In this case, a rating of "5" out of a range of 1 to 5 may be assigned to the corresponding natural language action statement in the natural language action statements (110). The rating of "5" indicates that the customer was satisfied, and further indicates a high correspondence, with respect to appropriate actions, between the customer's natural language issue statement and the customer service representative's natural language action statement.

The data repository (100) also stores an issue vector (116). More generally, a "vector," as used herein, as defined as a data structure including a tuple of one or more data entries. The values of the data entries values may be scalar values. For example, a one-dimensional, one-by-three vector may be in the form of $V=(V1,V2,V3)$, where V1, V2, and V3 are scalar values. The issue vector (116), therefore, is a vector composed of numbers output by an issue machine learning model (122) or a trained issue machine learning model (124), which took as input the natural language issue statements (102) (possibly together with scalar values and/or other data). Later, during the use of the machine learning models described herein, the issue vector (116) may also be formed by using the trained issue machine learning model (124) to embed the words in a new natural language issue statement (118), possibly together with scalar values and/or other data. Thus, most generally, the issue vector (116) is a vector formed by embedding words taken from either prior-stored natural language issue statements (102) or from newly transcribed words from the new natural language issue statement (118).

Figure 9:
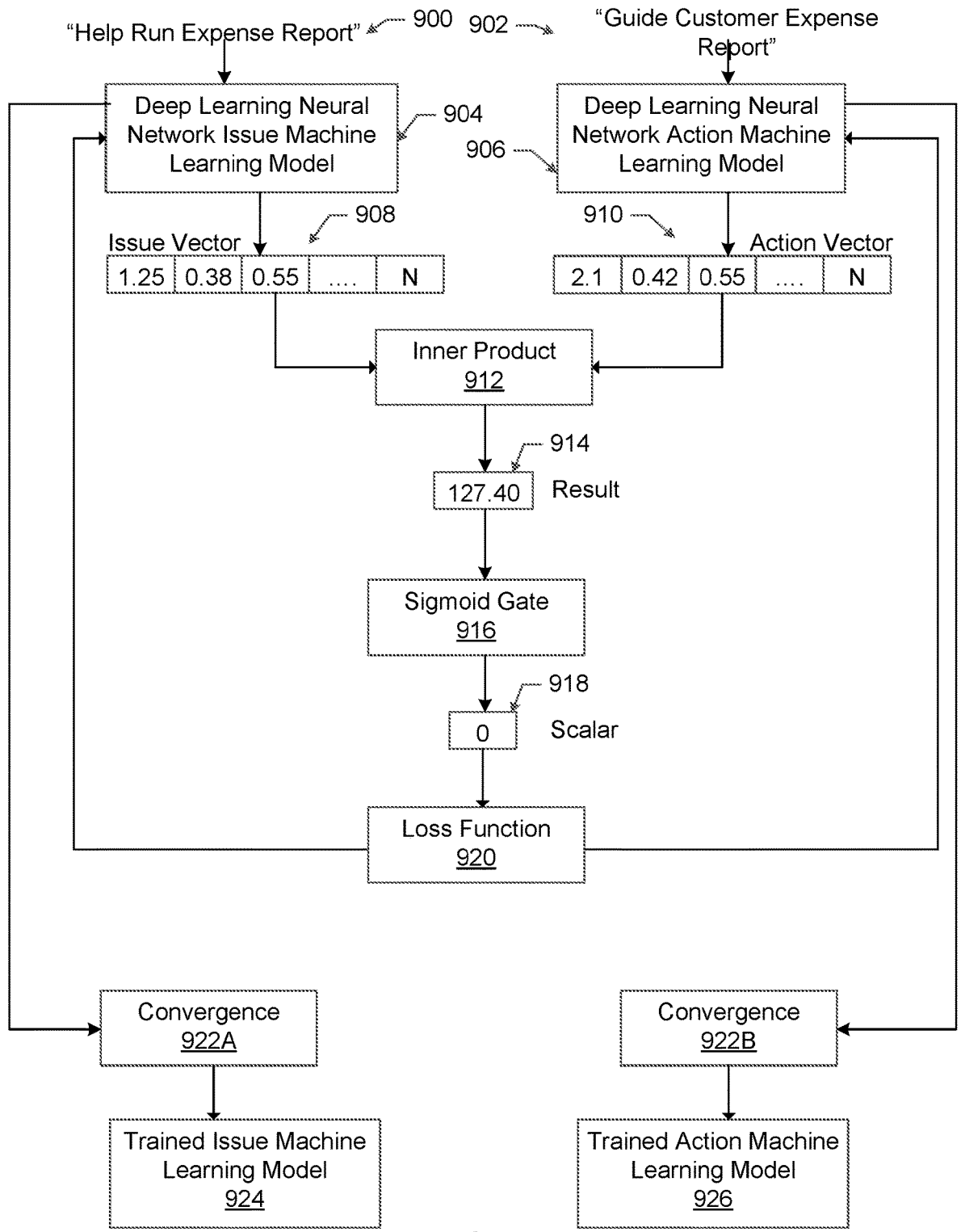
FIG. 9 shows an example of training a machine learning model, in accordance with one or more embodiments of the invention.

The term "embed," as used herein, is defined as a process used to transform a series of natural language words into a sequence of numbers that are correlated to the natural language words. An example of an embedded natural language action statement and an embedded natural language issue statement is shown in FIG. 9.

The data repository (100) also stores an action vector (120). The action vector (120) is a vector composed of numbers output by an action machine learning model (126) or a trained action machine learning model (128), which took as input the natural language action statements (110) (possibly together with scalar values and/or other data). Thus, the action vector (120) is an embedded representation of the natural language action statements (110).

The data repository (100) also stores an issue machine learning model (122). Most broadly, a machine learning model is a definition of a mathematical formula with a number of parameters (such as weights) that are to be learned from known data (123). Known data (123) is data for which a known result (123A) is available. In turn, a known result (123A) is a known correspondence between data in the known data (123). For example, it may be known that a certain issue statement definitely relates to a corresponding action statement known to have had a favorable customer review.

In machine learning, the machine learning model is fit to the known data (123) in a process known as training. Training of the machine learning models presented herein is described with respect to at least FIG. 2, FIG. 3, and FIG. 5. Once the machine learning model has been fit to the known data (123), then the machine learning model is ready for use. In use, new data for which a favorably reviewed action statement is not known (i.e., data from the new natural language issue statement (118)) is applied to the trained machine learning model to generate a predicted output to find a likely action statement which is predicted to be of use in resolving the new natural language issue statement (118). Use of the machine learning models presented herein is described with respect to at least FIG. 4 and FIG. 6.

More specifically, the issue machine learning model (122) is a machine learning model that is used to embed the natural language issue statements (102). The issue machine learning model (122) may be a deep learning machine learning model. More specifically, the issue machine learning model (122) may be a deep neural network, but could be a deep belief network, a recurrent neural network, or a convolutional neural network. Most broadly, the issue machine learning model (122) may be any suitable type of machine learning model used for performing natural language processing.

Once trained, the issue machine learning model (122) is referred-to as a trained issue machine learning model (124). The trained issue machine learning model (124) is used to embed the new natural language issue statement (118) during use of the system, as described with respect to at least FIG. 4 and FIG. 6.

The data repository (100) also stores an action machine learning model (126). The action machine learning model (126) is a machine learning model that is used to embed the natural language action statements (110). The action machine learning model (126) may be a deep learning machine learning model. More specifically, the action machine learning model (126) may be a deep neural network, but could be a deep belief network, a recurrent neural network, a convolutional neural network. Most broadly, the action machine learning model (126) may be any suitable type of machine learning model used for performing natural language processing.

Once trained, the action machine learning model (126) is referred-to as a trained action machine learning model (128). Training of the action machine learning model (126) is described with respect to FIG. 2. The trained action machine learning model (128) is used to generate an actions matrix (130). The actions matrix (130) is defined further below, and is used as described with respect to at least FIG. 3 and FIG. 4.

Attention is now turned to the nomenclature used with respect to the issue machine learning model (122) and the trained issue machine learning model (124). The term "issue" in "issue machine learning model (122)", prior to training, does indicate a structural difference between a commonly available deep learning machine learning model and the issue machine learning model (122). In one or more embodiments, the structural difference is that the weights and/or mathematical formulae that compose the machine learning model are tailored to the expected dimensions and type of data in the issue vector (116). Similarly, a structural difference exists between issue machine learning models at each stage of training of the issue machine learning model (122). Likewise, a structural difference exists between the issue machine learning model (122) and the trained issue machine learning model (124), as the process of training may change the definition of the weights and/or mathematical formulae that composes the issue machine learning model (122). Thus, the terms "issue" and "trained issue" used with respect to the term "machine learning model" refer to real differences in structure and not just in function of the respective machine learning models.

In one or more embodiments, the issue machine learning model (122) and the action machine learning model (126) may be a same type of machine learning model. For example, both of the machine learning models may be deep neural networks. The one or more embodiments specifically contemplate that, prior to any training, the issue machine learning model (122) and the action machine learning model (126) may operate in the same space and/or may be identical to each other. Operating in the "same space" means that the mathematical functions that define the issue machine learning model (122) and the trained issue machine learning model (124) may be designed to operate on the same types of input parameters. However, because the training of the two machine learning models is different (i.e., different data is used to train the two machine learning models), the trained issue machine learning model (124) is structurally different than the trained action machine learning model (128). Thus, the trained issue machine learning model (124) is different in both nomenclature and structure from the trained action machine learning model (128).

Attention is now turned to the actions matrix (130). The actions matrix (130) is composed of elements of the natural language action statements (110). As used herein, an "element" is a string of numbers, and possibly other data, that embed a single natural language action. Thus, each element corresponds to a single embedded natural language issue statement. An "element" is also a subset of the total string of all numbers that compose the action vector (120), as the action vector (120) embeds the natural language text of many or all of the natural language action statements (110). Thus, an "element" also may be viewed as a string of numbers, and/or other data, in a portion of the action vector (120). Each element may be converted into in natural language words (i.e., made expressible in natural language) by attributing the numerically embedded portions of the action vector (120) to the corresponding natural language words.

The elements may be termed centroid-vectors (132). The centroid-vectors (132) are vectors that are related to, or "centered on" (as mathematically defined) a particular natural language action statement in the natural language action statements (110). For example, one of the centroid-vectors (132) may be "try rebooting your computer," which was an action previously deemed to have successfully resolved the issue statement, "my application has frozen, please help." Thus, the actions matrix (130) may be conceived as a table which contains many or all available natural language action statements (110), which have been embedded into numerical expressions. Each row of the table of the actions matrix (130) includes a number of words that describe a single action taken to resolve a prior-identified, corresponding issue. The process of generating the actions matrix (130) and the centroid-vectors (132) is described with respect to FIG. 3. Use of the actions matrix (130) is described with respect to FIG. 4.

The data repository (100) also stores probabilities (134). Each probability in the probabilities (134) defines a mathematically defined estimate that a given corresponding prior action is relevant to a given issue vector. The probability may be a number defined between zero and one, with zero representing no chance that a given corresponding centroid-vector in the centroid-vectors (132) is relevant to the given issue vector (116), and one representing complete certitude that the given corresponding centroid vector is relevant to the given issue vector (116).

The data repository (100) also stores a threshold value (136). The threshold value (136) is a number selected by a human programmer, or possibly by some other machine learning process. The threshold value (136) is compared to the probabilities (134). Centroid-vectors (132) associated with probabilities below the threshold value (136) may be discarded, whereas centroid-vectors (132) associated with probabilities above the threshold value (136) may be retained, as described with respect to at least FIG. 4 and FIG. 6. The centroid-vectors (132) which are associated with probabilities above the threshold value (136) may be described as a subset of the centroid-vectors (132). Because each of the centroid-vectors (132) represents a prior action taken, the subset may also be described as a subset of prior actions.

The data repository (100) also stores a list of proposed actions (138). The list of proposed actions (138) is composed of the subset of prior actions, described immediately above. The list of proposed actions (138) that have been determined to be relevant to the issue vector (116) may be displayed on a computer display to a customer service representative in an ordered list from highest probability to lowest probability. The probabilities may be displayed together with the corresponding proposed actions. A customer service representative, or possibly another computerized process, may then choose a selected action (140) from among the list of proposed actions (138). The selected action (140) may then be communicated to the customer via audio, video, or textual feedback by the customer service representative or a chatbot. Further details regarding the generation and use of the list of proposed actions (138) and the selected action (140) are described with respect to at least FIG. 4 and FIG. 6.

The data repository (100) may also store a sigmoid gate (142). The sigmoid gate (142) is a mathematical function in the form of:

$$\sigma(x) = \frac{L}{1 + e^{-k(x-x_0)}},$$

where L is a maximum value of a curve defined by σ (x), k is the steepness of the curve, $x_0$ is a numerical value of the sigmoid curve's midpoint, and x is the variable. The letter "e" represents Euler's number.

The sigmoid gate (142) is used during training of the issue machine learning model (122) and the trained issue machine learning model (124). Again, training of the machine learning models is described with respect to at least FIG. 2 and FIG. 5.

The data repository (100) also stores a loss function (144). The loss function (144) is a mathematical function that maps an event or values of one or more variables onto a real number which represents a cost associated with the event. The loss function (144) is used to train, or mathematically optimize, the issue machine learning model (122) and the trained issue machine learning model (124). Use of the loss function (144) is described with respect to at least FIG. 2 and FIG. 5, as well as FIG. 9.

The system shown in FIG. 1 may include other components. For example, the system shown in FIG. 1 may also include a processor (146). The processor (146) may take the form of one or more computer processors in a possibly distributed computing environment, as described with respect to at least FIG. 11A and FIG. 11B.

In one embodiment, the processor (146) is configured to be or used to execute the machine learning execution engine (148) and/or the actions matrix generation engine (150), defined below. It is contemplated that the processor (146) is under the control of the entity that also controls the customer service representative center. Thus, the processor (146) may be deemed "local" or "server-side." However, in other embodiments, the processor (146) may also be or used to execute the other engines described with respect to FIG. 1, such as the speech recognition engine (106), the call service (112), the action selection engine (152), the user device (154), and combinations thereof. In the case that the user (104) is internal to the organization running the customer service representative center and the system shown in FIG. 1, it is possible that the processor (146) also is used to execute the computer used by the user (104). However, in many cases, the user (104) will be executed by a different processor that is deemed "remote" (i.e., "client-side").

Attention is now turned to the various engines described with respect to FIG. 1. As used herein, an "engine" is software and/or hardware configured to perform the function defined for a particular engine. An engine is defined by computer code or application specific integrated circuits.

In the system shown in FIG. 1, the speech recognition engine (106) is programmed to receive a voice message from the user (104) when the user (104) places a call (108) to the customer service center via the call service (112). The speech recognition engine (106) is further programmed to convert the voice message into computer-readable data, such as text and/or numbers.

The machine learning execution engine (148) is programmed to execute one or more of the machine learning models described above, such as the issue machine learning model (122), the trained issue machine learning model (124), the action machine learning model (126), and the trained action machine learning model (128). The machine learning execution engine (148) may be programmed to execute additional machine learning models, if desirable. Use of the machine learning execution engine (148) is described with respect to the actions taken with respect to the issue machine learning model (122), the trained issue machine learning model (124), the action machine learning model (126), and the trained action machine learning model (128), as described with respect to at least FIG. 2 through FIG. 6.

The actions matrix generation engine (148) is programmed to generate the actions matrix (130). Generation of the actions matrix (130) is described with respect to at least FIG. 3.

The action selection engine (152) is programmed to select the selected action (140) from the list of proposed actions (138). The action selection engine (152) may be a set of rules for selecting among the highest probability suggested actions. The action selection engine (152) may be another machine learning model which take into account more than the probabilities (134). In some cases, the action selection engine (152) may be not present or unavailable, in which case, the agent (103) may manually select the selected action (140) from the list of proposed actions (138).

Figure 2:
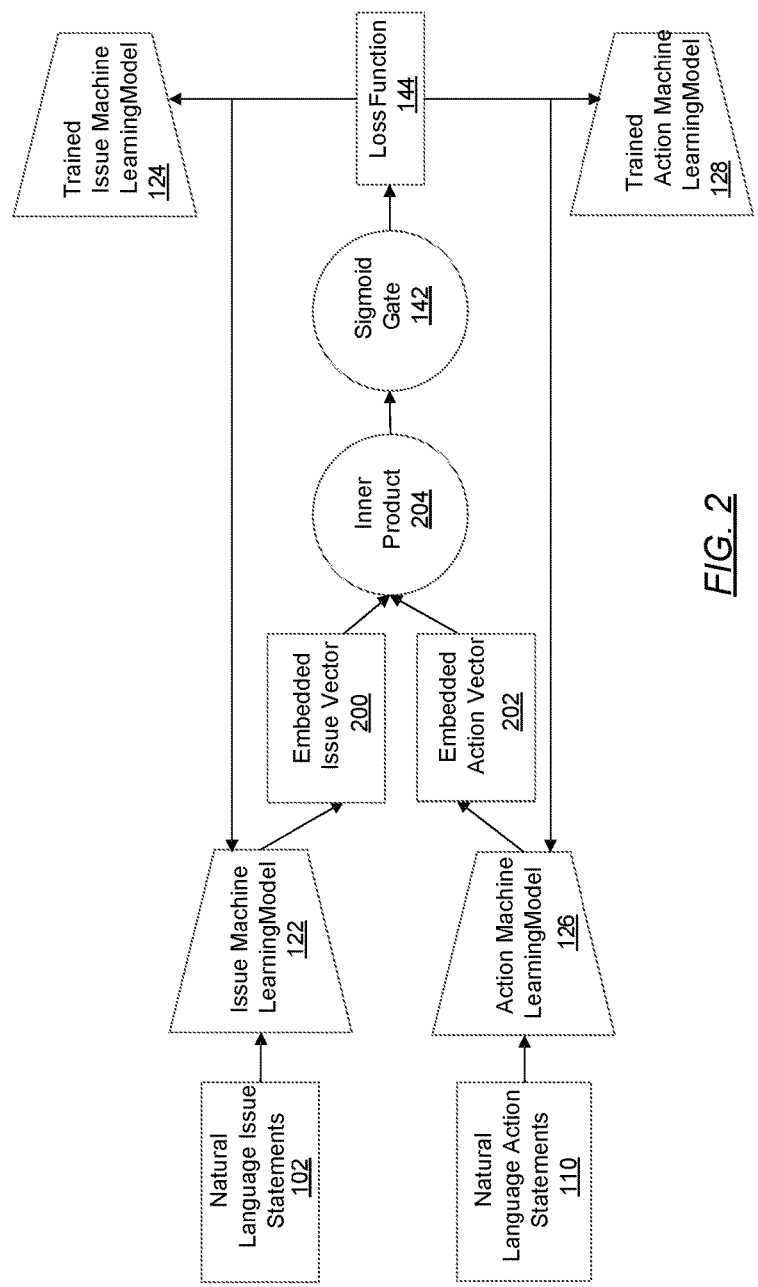
FIG. 2, FIG. 3, and FIG. 4 show variations of the computing system shown in FIG. 1, in accordance with one or more embodiments of the invention.
Figure 3:
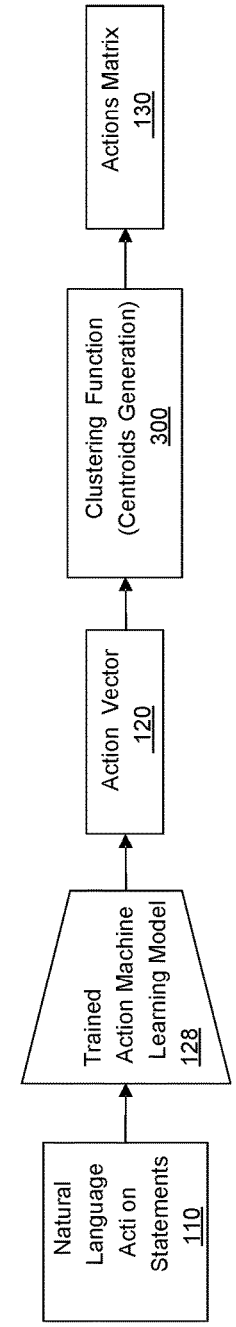
Figure 4:
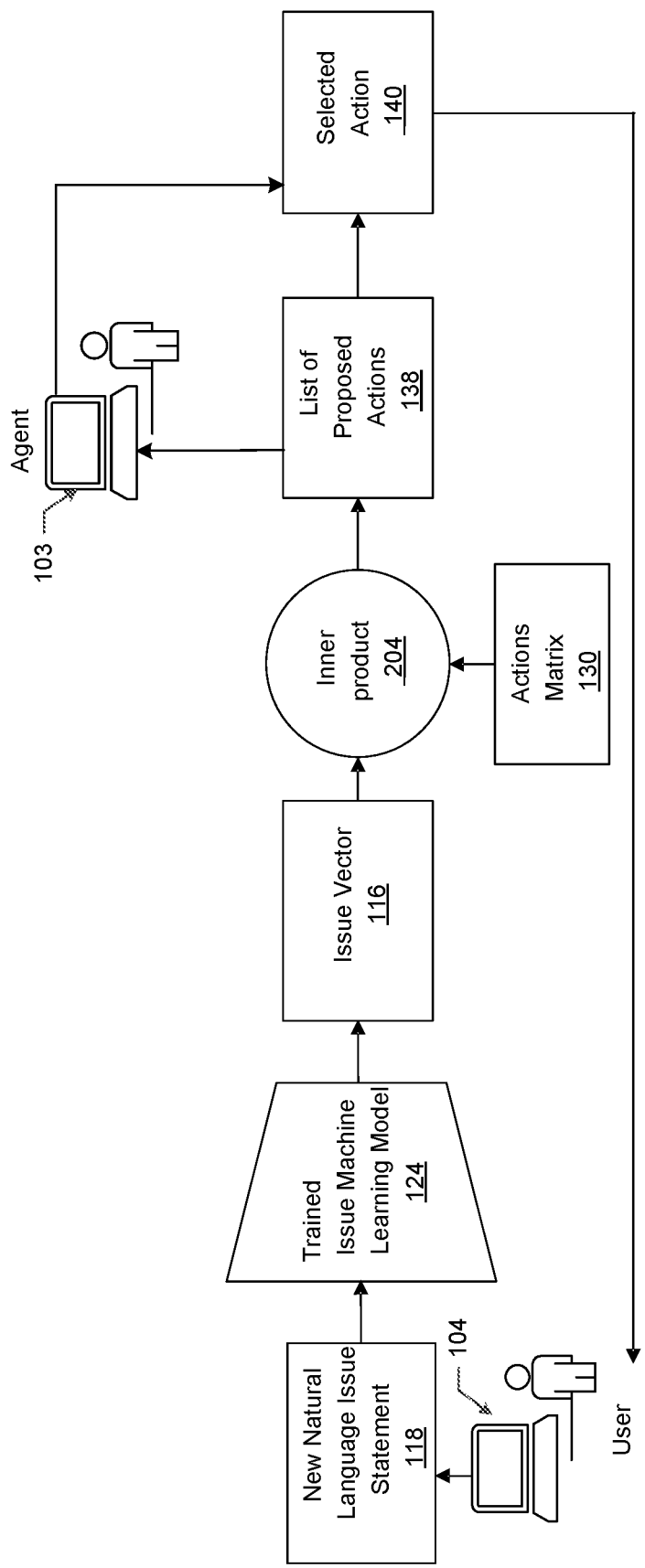

FIG. 2, FIG. 3, and FIG. 4 show variations or sub-embodiments of the computing system shown in FIG. 1, in accordance with one or more embodiments of the invention. In particular, FIG. 2 through FIG. 4 shows an arrangement of components to show operation of the system shown in FIG. 1. Reference numerals common to FIG. 1 and FIG. 2 through FIG. 4 refer to similar objects and have similar definitions. However, FIG. 2 through FIG. 4 contain some additional components for explanatory purposes. Such additional components may be considered as sub-components of the system shown in FIG. 1.

FIG. 2 shows parts of the system shown in FIG. 1 during training of the issue machine learning model (122) and the action machine learning model (126). As shown in FIG. 2, the natural language issue statements (102) are provided as input to the issue machine learning model (122). In turn, the natural language action statements (110) are provided as input to the action machine learning model (126). In this case, the natural language issue statements (102) and the natural language action statements (110) are taken from the set of known data (123).

The issue machine learning model (122), when executed, embeds the natural language issue statements (102) into a vector space as a first output. The term "vector space" is defined further below. The first output, in the form of the issue vector (116), may be called the embedded issue vector (200). Thus, the output of the issue machine learning model (122) is the embedded issue vector (200), which is the natural language issue statements (102) embedded in the vector space.

Similarly, the action machine learning model (126), when executed, embeds the natural language action statements (110) into the vector space as a second output in the form of the action vector (120), which may be called an embedded action vector (202). Thus, the output of the action machine learning model (126) is the embedded action vector (202), which is the natural language action statements (110) embedded in the vector space.

In one or more embodiments, the term "vector space" is defined as the number of dimensions of a vector and the type of procedure used to embed a natural language word (and hence influence how a given number represents a given word.) As mentioned above, in an embodiment, the vector space of both the embedded issue vector (200) and the embedded action vector (202) is the same. In other words, the embedded issue vector (200) and the embedded action vector (202) have the same dimensions and use the same numbers to represent the same words. However, the one or more embodiments contemplate that the vector spaces of the embedded issue vector and the embedded action vector might be different, though a translation procedure may be used to compare words that might be embedded using different numbers.

Next, the inner product (204) of the embedded issue vector (200) and the embedded action vector (202) is calculated. The inner product (204) is the result of a mathematical function of linear algebra in which matrices are multiplied or otherwise manipulated by the mathematical function. In this case, the matrices being multiplied are the embedded issue vector (200) and the embedded action vector (202). For the one-dimensional matrices used in some of the one or more embodiments, the inner product (204) results in a single scalar number. However, the inner product (204) may be further modified by other mathematical functions, such as the sigmoid gate (142).

The output of the sigmoid gate (142) may be a number in the range of zero or one (not zero to one) for each sequence of issue statements and action statements represented in the inner product (204). The numbers represents a prediction of whether a given issue statement and corresponding given action statement are from the same call (represented by a value of "1") or not (represented by a value of "0"). Note, that, during training, only action statements having a known positive outcome may be used. Thus, in one or more embodiments, action statements having a known negative outcome (i.e., the customers were not satisfied with the actions) may be excluded from the data set.

The numbers output by the sigmoid gate (142) are provided to the loss function (144). The loss function (144) compares the numbers output by the sigmoid gate (142) to the known result (123A). If the known result for whether a given issue and a given action are the same call is "1" (known to be related to the same call), but the output of the sigmoid gate (142) indicates that the given issue and given action have a value of "0" (predicted not to be related to the same call), then a difference is generated. That difference may then be used to inform the corresponding machine learning model that the particular prediction was not accurate. The corresponding machine learning model is likewise informed if the prediction was accurate.

The differences calculated by the loss function (144) may be more complex than simply subtracting 1 from 0. For example, in one embodiment, the loss function (144) may be defined by a cross-entropy process. An example of a cross-entropy process is described with respect to FIG. 9.

In any case, the differences identified by the loss function (144) are provided back to the issue machine learning model (122) and the action machine learning model (126). The issue machine learning model (122) and the action machine learning model (126) are then automatically modified by changing the functions and/or parameters (such as weights) within the respective machine learning models.

A new set of calculations is then performed using the next iteration of the adjusted machine learning models, but using the same inputs. The process described above is repeated. In one or more embodiments, the procedure is iterated a number of times until convergence.

Convergence occurs when the $i^{th}$ results of the loss function (144) on iteration "i" are within a threshold amount of the results of the $(i+1)^{th}$ results of the loss function (144) on iteration "i+1." For example, if convergence is defined at 99%, and the results of the loss function (144) on iteration "i" are 99 percent identical with the results of the loss function (144) on iteration "i+1", then the process of iteration may end. The selected percentage chosen for convergence may vary, and may be designated by someone with technical expertise or set automatically.

After convergence, the issue machine learning model (122) and the action machine learning model (126) are considered trained. For purposes of illustration in FIG. 2, and because the machine learning models have been substantively changed by the training process, the trained issue machine learning model (124) and the trained action machine learning model (128) are shown as the final outputs of the training process. The trained issue machine learning model (124) is trained to receive the new natural language issue statement (118) and embed the new natural language issue statement (118) into the issue vector (116).

Likewise, the trained action machine learning model (128) is trained to receive a natural language action statement and embed the action statement into the action vector (120). Thus, the action vector (120) is a version of the natural language action statements (110) that are embedded into the same vector space as the issue vector (116).

Attention is now turned to FIG. 3. FIG. 3 represents a pre-production phase performed after the training shown in FIG. 2, but prior to receiving new user issue statements in the form of calls to a customer service center as shown in FIG. 4. In particular, FIG. 3 describes the generation of the actions matrix (130).

The natural language action statements (110) are provided, again, as input to the trained action machine learning model (128). As described above, the trained action machine learning model (128) embeds the natural language action statements (110) into the action vector (120). Because the trained action machine learning model (128) was used, it valid to assume that the resulting action vector (120) is an accurate embedding of the natural language action statements (110) into the vector space.

However, the action vector (120) may be a long vector containing all possible statements in the natural language action statements (110) among a wide variety of calls. Thus, the action vector (120) cannot be easily compared to the issue vector (116) for a new natural language issue statement. An improved data structure is useful to achieve the comparison. The improved data structure is the actions matrix (130), which again contains rows of numbers that correspond to known natural language action statements, with each row of numbers being related to corresponding embedded versions of the known natural language issue statements.

To produce the actions matrix (130), the action vector (120) is provided as input to a clustering function (300). The clustering function (300) aggregates similar actions together by discretizing the vector space of the action vector (120). In this manner, each action may be treated as a corresponding centroid vector in the centroid-vectors (132). The centroid-vectors (132) are stored in the form of a matrix, which is the actions matrix (130). Each row in the actions matrix (130) corresponds to one of the available actions that a customer service representative might take in response to the natural language issue statements (102).

Attention is now turned to FIG. 4, which presents a production phase in which the new natural language issue statement (118) is received from the user (104). In FIG. 4, it is assumed that speech recognition has been performed on the verbal statement made by the user (104) regarding the purpose of the call. In other words, the user's verbal issue statement has been transformed into the new natural language issue statement (118) via a speech recognition process.

The new natural language issue statement (118) is provided to the trained issue machine learning model (124). In turn, the trained issue machine learning model (124) embeds the new natural language issue statement (118) into the issue vector (116) in the vector space. The vector space of the issue vector (116) is the same as the vector spaces as the action vector (120) which was used to generate the actions matrix (130).

Linear algebra between the issue vector (116) and the actions matrix (130) is performed to form a new inner product (204). The inner product (204) thus is a set of predictions (i.e., probabilities) that any given issue contained in the issue vector (116) relates to a given action specified in the actions matrix (130). The inner product (204) also generates a number representing a prediction or probability that a given action specified in the actions matrix (130) addresses the issue vector (116). The inner product (204), optionally, may be provided to another sigmoid gate function for further refinement of the predictions.

A number of actions that have probabilities above a pre-defined threshold value (136) are then added to the list of proposed actions (138). In turn, the list of proposed actions (138) is translated from embedded form into natural language form, and then provided to the agent (103). The agent may select from among the list of proposed actions (138) as the selected action (140). The agent (103) may then communicate the selected action (140) to the user (104).

Alternatively, the list of proposed actions (138) may be provided to a set of rules or policies which selects one or several of the actions in the list of proposed actions (138) as the selected action (140). For example, a chatbot could determine the selected action (140) and transmit the selected action (140) automatically to the user (104) for the user's consideration.

While FIG. 1 through FIG. 4 show configurations of components, other configurations may be used without departing from the scope of the invention. For example, various components may be combined to create a single component. As another example, the functionality performed by a single component may be performed by two or more components.

Figure 5:
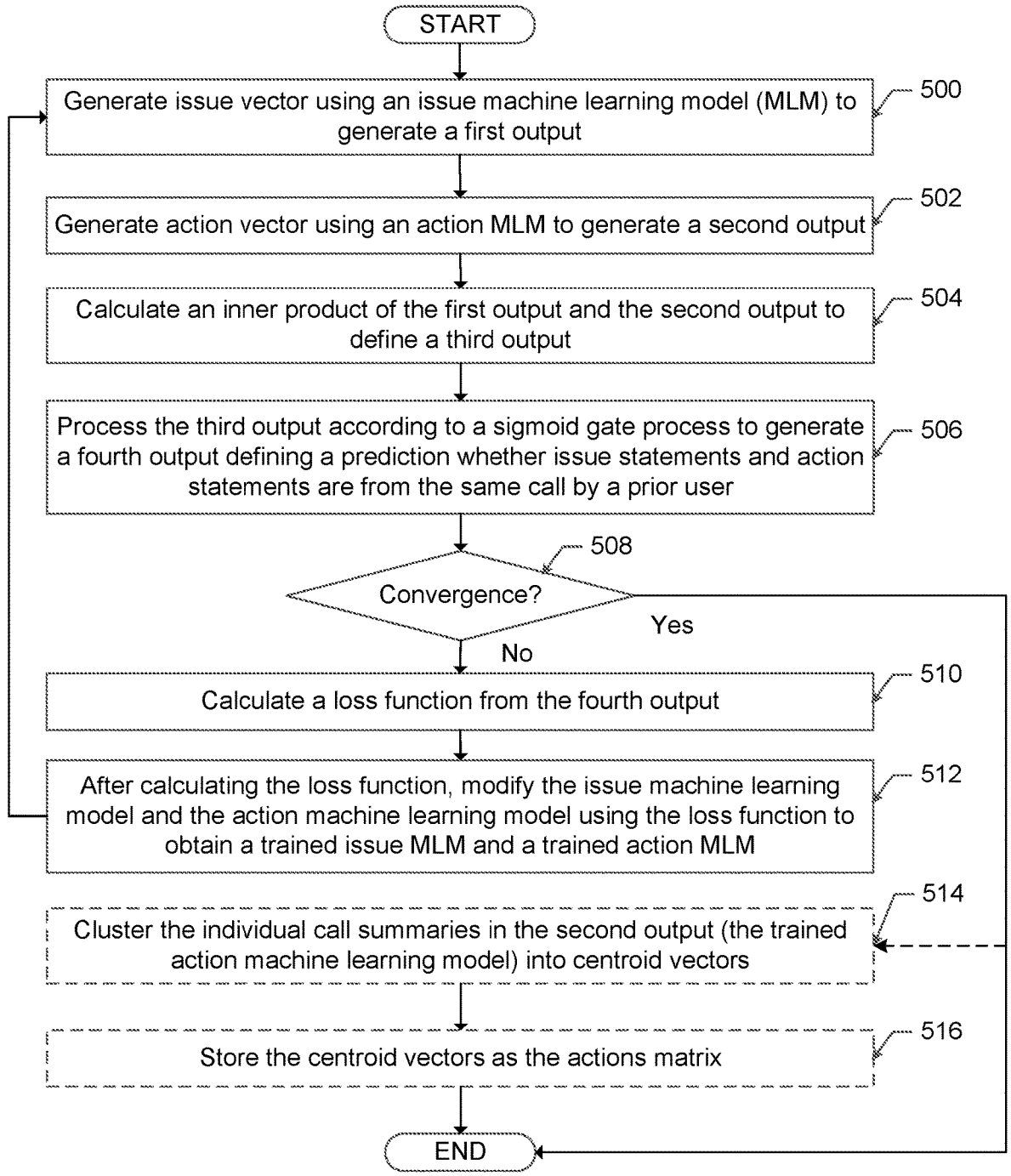
FIG. 5 shows a method of training a machine learning model, in accordance with one or more embodiments of the invention.
Figure 6:
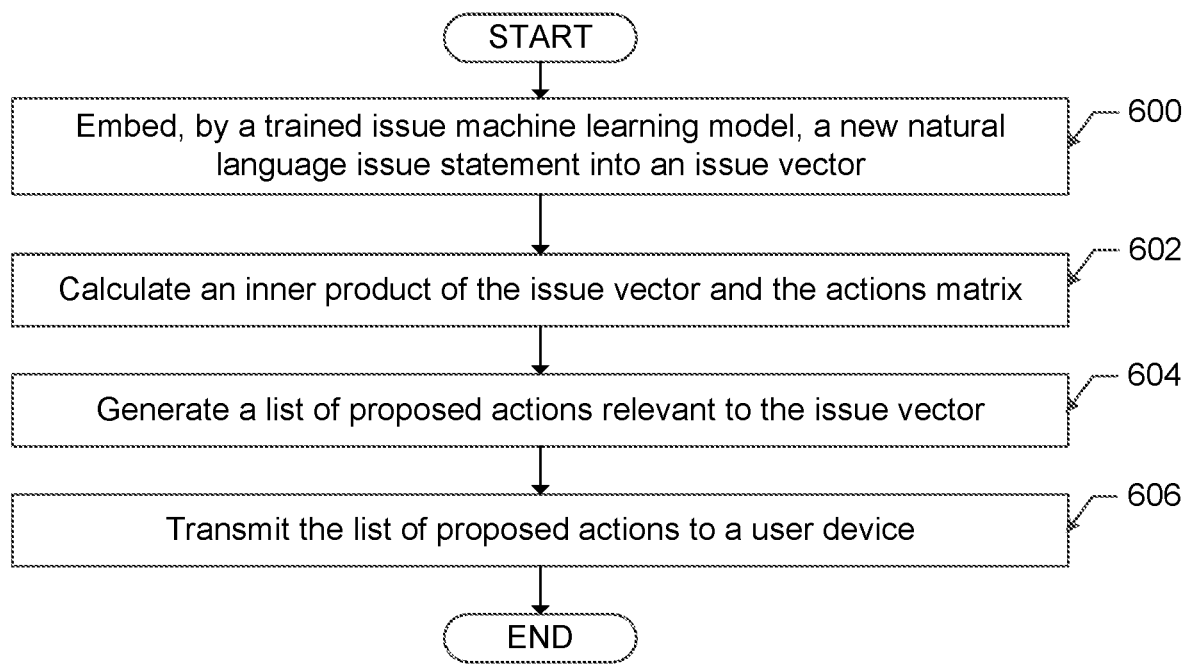
FIG. 6 shows a method of using the machine learning model as trained by the method of FIG. 5, in accordance with one or more embodiments of the invention.

FIG. 5 shows a method of training a machine learning model, in accordance with one or more embodiments of the invention. FIG. 6 shows a method of using the machine learning model as trained by the method of FIG. 5, in accordance with one or more embodiments of the invention. The methods shown in FIG. 5 and FIG. 6 may be performed using a processor, such as the computing system shown in FIG. 11A and FIG. 11B, using a system, such as the systems shown in FIG. 1 through FIG. 4. Terms used with respect to FIG. 5 and FIG. 6 are defined with respect to FIG. 1 through FIG. 4.

At step 500, an issue vector is generated using an issue machine learning model to generate a first output. Generating the issue vector is performed by providing natural language issue statements as input to a deep learning machine learning model. The deep learning machine learning model performs its mathematically defined function on the input. As a result, the first output may be the embedded issue vector, as described above with respect to FIG. 1 through FIG. 4.

At step 502, an action vector is generated using an action machine learning model to generate a second output. Generating the action vector is performed by providing natural language action statements as input to a second deep learning machine learning model. The natural language action statements are related to the natural language issue statements in that each of the natural language action statements correlate to at least one call from which the natural language issue statements were derived. The second deep learning machine learning model performs its mathematically defined function on the second input. As a result, the second output may be the embedded action vector, as described above with respect to FIG. 1 through FIG. 4. As described above, the issue machine learning model and the action machine learning model may be the same type of machine learning model.

For steps 500 and 502, as indicated above, generating the issue vector and the action vector embeds the respective vectors into a known vector space. In particular, processing the issue vector embeds first natural language issue statements into a first vector space. Thus, the first output is defined in the first vector space. Likewise, processing the action vector embeds the second natural language action statements into the first vector space. Thus, the second output is also defined in the first vector space.

At step 504, an inner product of the first output and the second output is calculated. The inner product is a third output. The inner product may calculated by performing linear algebra to multiply the matrix that defies the first output by the matrix that defines the second output.

At step 506, the third output is processed according to a sigmoid gate process to generate a fourth output defining a prediction whether issue statements and action statements are from the same call. Stated differently, the prediction is a prediction whether a given natural language issue statement in the natural language issue statements and a corresponding given action statement in the natural language action statements relate to a same call placed by a user. The sigmoid gate process may be performed by providing the third output to a sigmoid mathematical function.

The process of steps 500 through 506 may be reiterated a number of times until convergence occurs. Thus, at step 508, a determination is made whether convergence, as defined above, has occurred. Convergence may occur after conducting the procedure of steps 500 through 506 once, as confirmed by an iteration of steps 500 through 506. However, convergence may occur after many iterations, or may occur when a software engineer decides to end the iteration process.

If convergence has occurred (a "yes" determination at step 508), then the process terminates. Optionally, instead, the process may continue at step 514, as described further below with respect to generating the actions matrix. If convergence has not occurred (a "no" determination at step 508), then the process continues to step 510.

At step 510, a loss function is calculated from the fourth output. The loss function may be calculated by comparing the fourth output to a known result in which known data indicates whether the given natural language issue statement and the given natural language action statement are in the same call placed by the user. The difference between the fourth output and the known result forms the loss function, which may be fed back to the issue machine learning model and the action machine learning model. An example of generating a loss function is described with respect to FIG. 9.

At step 512, the issue machine learning model and the action machine learning model are modified using the loss function. Modification is performed automatically by the machine learning models themselves by self-adjusting the mathematically defined functions, weights, and/or other parameters that compose the machine learning models. The modifications are designed such that, when the machine learning model is executed again, a better match to the known result will be output. The process then returns to step 500.

After convergence, the result of modifying the issue machine learning model and the action machine learning model is a trained issue machine learning model and a trained action machine learning model. The trained issue machine learning model is trained to encode new natural language issue statements into a new vector in the first vector space. The trained action machine learning model is trained to embed the known natural language action statements into the first vector space. Note that while the pre-trained action machine learning model and the trained action machine learning model perform the same essential functions, the trained action machine learning model has been empirically demonstrated, through training, to be more accurate than the pre-trained action machine learning model.

The process shown in FIG. 5 optionally, after convergence, may be extended to include generation of the actions matrix described above. Optional steps are shown as surrounded by dashed boxes.

Thus, at optional step 514, the individual call summaries in the second output (i.e., the output of the trained action machine learning model) are clustered into centroid vectors. Clustering may be performed by cluster analysis techniques, which is a mathematical task of grouping a set of objects in such a way that objects in the same group (i.e., a cluster) are more similar in a mathematically defined sense to each other than to those in other groups. Different clustering algorithms may be used, other than centroid-based clustering, such as connectivity-based clustering, distribution-based clustering, density-based clustering, and others.

At optional step 516, the centroid vectors may be stored as the actions matrix. Storing the centroid vectors may include causing each row of the actions matrix to correspond to one of many available actions expressed in natural language. The actions matrix may be stored in a non-transitory computer readable storage medium. The method of FIG. 5 may terminate thereafter.

Attention is now turned to FIG. 6, which is a flowchart of a method of using a trained issue machine learning model. Thus, the method shown in FIG. 6 may be performed after having performed the method shown in FIG. 5 or some other training of the model recently or in the past. The method shown in FIG. 6 assumes that optional steps 514 and 516 of FIG. 5 are performed in to form the actions matrix. The method shown in FIG. 6 also assumes that a new user call has been received and processed by speech recognition, as described with respect to FIG. 1.

At step 600, a trained issue machine learning model embeds a new natural language issue statement into an issue vector. The process of embedding is performed by receive the new natural language issue statement as input to the trained issue machine learning model and then applying the mathematical functions of the trained issue machine learning model to the input. The issue vector is in a pre-defined vector space, as described above.

At step 602, an inner product of the issue vector and the actions matrix is calculated. Calculation of the inner product may be performed by linear algebra by multiplying the matrix defining the issue vector with the actions matrix. Calculating the inner product results in probabilities associated with corresponding ones of prior actions (centroid-vectors) defined in the actions matrix. Each of the probabilities represents a corresponding estimate that a corresponding prior action is relevant to the issue vector. Optionally, a sigmoid gate function may be applied to the result to form a modified result having modified probabilities.

At step 604, a list of proposed actions relevant to the issue vector is generated. The list of proposed actions may be generated by comparing the probabilities (or the modified probabilities) to a threshold value, and then selecting a subset of the prior actions with corresponding probabilities above the threshold. Optionally, the list of proposed actions may be ordered from a highest probability to a lowest probability. Optionally, all possible actions might be shown with associated probabilities.

At step 606, the list of proposed actions may be transmitted to a user device. For example, the system may cause the list of proposed actions to be transmitted to a computer operated by a customer service representative, and then displayed on a display screen of that computer. The method of FIG. 6 may terminate thereafter.

Optionally, additional details regarding a displayed option may be displayed or made displayable to the customer service representative. For example, one or more of the actions may be displayed together with a description of a corresponding action and/or instructions on how to perform the corresponding action. The display device may display a button which, when activated by the customer service representative, will display further detail regarding a proposed action, or possibly details of a prior call in which a similar problem was resolved with respect to a prior-user's similar, but past, issue statement. In this manner, the customer service representative may review additional detailed regarding a proposed action in order to better guide a current user to resolution of the current user's issue.

While the various steps in flowcharts of FIG. 5 and FIG. 6 are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 7 through FIG. 10 provide an example of the training and use of the issue machine learning model and the action machine learning model, as described more fully above with respect to at least FIG. 1 through FIG. 6. The following example is for explanatory purposes only and not intended to limit the scope of the invention.

Turning first to FIG. 7 and FIG. 8, examples of data useable in the one or more embodiments are shown. In particular, FIG. 7 shows raw data. FIG. 8 shows pre-processed data. The "positive" data shown in FIG. 8 is an example of the kind of data that forms the natural language issue statements (102) and natural language action statements (110) described with respect to FIG. 1.

The data shown in FIG. 7 and FIG. 8 reflect past user calls to a customer service center. Each user had an issue that the user wished to resolve with respect to an application that the users paid to use. For purposes of example, the application is called "WonderApp," though no reference to a real application is intended. In each case, the customer service representative proposed an action to resolve the issue, with the action expressed in natural language. The customer then rated the action as to whether the action successfully resolved the user's issue.

FIG. 7 shows three natural language issue statements in column (700). The natural language issue statements are the kinds of statements that users might actually make to a customer service representative during a phone call to a customer service center. Optionally, the natural language statement could have been recorded prior to connection to a customer service representative by prompting the user to state his or her issue (e.g., "please state a reason for your call.") In this manner, the system may have time to process the natural language issue statement prior to connecting the user to the customer service representative.

Additionally, FIG. 7 shows natural language action statements in column (702). Each natural language action statement corresponds to one of the natural language issue statements in this example.

Additionally, FIG. 7 shows customer ratings in column (704). Customer ratings are expressed as "stars." A rating of five stars indicate complete customer satisfaction in this example. A rating of four starts indicates customer satisfaction, but not complete customer satisfaction in this example. A rating of three stars indicates customer ambivalence in this example. A rating of two stars indicates that the customer was dissatisfied with the action, but not completely dissatisfied with the action in this example. A rating of one star indicates customer complete dissatisfaction in this example.

Again, the data shown in FIG. 7 may be "raw" data; that is, the data in FIG. 7 is the initial data that the system will be provided. Pre-processing of the data shown in FIG. 7 may be performed, prior to the steps described with respect to the methods of FIG. 5 or FIG. 6. Pre-processing the data shown in FIG. 7 may include identifying which of the issue statement-action statement pairs will be included in the natural language issue statements (102) and the natural language action statements (110) shown in FIG. 1, and subsequently used in the methods described with respect to FIG. 2 through FIG. 6. In particular, as shown with respect to FIG. 8, some issue-action statement pairs will be excluded from use.

FIG. 8 shows the results of such pre-processing, and presents the data accordingly. Reference numerals common between FIG. 7 and FIG. 8 relate to similar objects and have similar definitions.

Thus, column (700) again shows the natural language issue statements and column (702) again shows the natural language action statements. However, column (800) shows labels applied to each issue statement-action statement pair. The labels may be determined manually by a software engineer, or may have been automatically generated either by additional machine learning processing not described herein, or according to rules defined in some other software process. Each label is "positive" or "negative." A positive label indicates that both of the following conditions are true: a) the customer was completely satisfied or satisfied (four or five stars) and b) an action statement matches (or is relevant to) the corresponding issue statement. Optionally, as shown in column 802, a reason may be provided as to why the sample label identified in column 800 was applied.

Thus, for example, cell (800A) is assigned a "positive" label because the action statement is relevant (i.e., a match) to the corresponding issue statement, and because the customer satisfaction rating was high (five stars). The reason is indicated in cell (802A). However, as shown in cell (800B), the subsequent action statement-issue statement pair is assigned a "negative" label because the action did not actually correspond to the issue statement, despite the high customer rating. The reason is indicated in cell (802B). Additionally, the third issue action statement-issue statement pair is also assigned a "negative" label (800C) because the customer gave a "dissatisfied" rating (two stars) to the action. The reason is indicated in cell (802C).

In the example of FIG. 8, the first action statement-issue statement pair is accepted for use in the natural language issue statements (102) and the natural language action statements (110) shown in FIG. 1. The process repeats for however many issue statement and action statement pairs are available. When the process is completed, the processes of training and subsequently using the machine learning models, described above, may be performed.

FIG. 9 is a specific example of training the system shown in FIG. 1 through FIG. 4 and thus is a specific embodiment of the method shown in FIG. 5. Pre-processing of data, as explained in FIG. 7 and FIG. 8 has already been performed. Note that the numbers shown in FIG. 9 are "dummy" numbers; i.e., used for purposes of example only.

Initially, one of the natural language issue statements is "Help me run an expense report in WonderApp." The initial natural language issue statement is truncated, for purposes of efficient processing, to "help run expense report," as shown at natural language issue statement (900). The corresponding natural language action statement for the issue statement was "guide the customer through generation of the expense report." The initial natural language action statement is truncated, for purposes of efficient processing, to "guide customer expense report," as shown at natural language action statement (902).

In this example, the natural language issue statement (900) and the natural language action statement (902) are part of the training data. Thus, it is known that the natural language issue statement (900) and the natural language action statement (902) are related to the same call. Furthermore, because only successful, satisfactory action statements are included in the training data (see FIG. 7), it is also known that if the natural language issue statement (900) and the natural language action statement (902) are related to the same call, then the natural language action statement (902) is presumed to be useful to resolve the natural language issue statement (900).

The natural language issue statement (900) is provided as input to a deep learning neural network issue machine learning model (904). Similarly, the natural language action statement (902) is provided as input to a deep learning neural network action machine learning model (906).

The output of the deep learning neural network issue machine learning model (904) is an issue vector (908) which embeds the natural language issue statement (900) in a pre-defined vector space. As can be seen, the deep learning neural network issue machine learning model (904) embeds the natural language text "help run expense report" into a one dimensional matrix of numbers that represent that text. The matrix of the issue vector (908) has a length of "N". The value of "N" may be "128," but may be varied in other embodiments.

Similarly, the output of the deep learning neural network action machine learning model (906) is an action vector (910) which also the natural language action statement (902) in the pre-defined vector space. As can be seen, the deep learning neural network action machine learning model (906) embeds the natural language text "guide customer expense report" into a one dimensional matrix of numbers that represent that text. The matrix of the issue vector (908) has a length of "N". The value of "N" may be "128," but may be varied in other embodiments. However, the value of "N" for the deep learning neural network action machine learning model (906) is the same as the value of "N" for the deep learning neural network issue machine learning model (904).

After the issue vector (908) and the action vector (910) have been calculated, the inner product (912) of the issue vector (908) and the action vector (910) is calculated. The inner product is calculated according to linear algebra procedures for multiplying two, one-dimensional matrices. Thus, for example, if the issue vector (908) is defined as $(V_s)$ and the action vector (910) is defined as $(V_a)$, then the inner product is defined as: $\Sigma_i v_s^i * v_a^i$ which means that the inner product (912) of the issue vector (908) and the action vector (910) is determined by multiplying cell "C" in the issue vector (908) by cell "C" in the action vector (910) (for every cell in the two vectors), and then summing the values of the multiplied cells.

The result (914) of the inner product (912) is a scalar value (one number). In this example, the result (914) is the number "127.40." However, this number should be transformed in order to produce a loss function (described below) which is meaningful to the deep learning neural network issue machine learning model (904) and the deep learning neural network action machine learning model (906).

Thus, a sigmoid gate (916) is applied to the result (914). A "sigmoid gate" is a mathematical function. Because the product of the issue vector (908) and the action vector (910) yields a scalar for each pair of issue-action statements, the sigmoid in this example is defined by:

$$\sigma(x) = \frac{1}{1 + e^{-x}},$$

which is a simplified form of the more general sigmoid gate equation given above. Here, sigma (σ) represents the mathematical function, "e" is Euler's number, and X is variable.

The output of the sigmoid gate (916) is a scalar (918) having the value of either 1 or 0. In other words, the sigmoid gate (916) transforms the result (914) into either a "1" or a "0." A "1" indicates that the issue vector (908) and the action vector (910) are predicted as being related to the same call. A "0" indicates that the issue vector (908) and the action vector (910) are predicted as being in unrelated calls.

In this example, the scalar (918) is "0," indicating that the issue vector (908) and the action vector (910) are predicted to have been unrelated to the same call. In other words, the issue vector (908) and the action vector (910) are predicted to be unrelated to each other as an issue statement-action statement pair in which the action statement successfully resolved the issue statement.

However, the prediction represented by the scalar (918) is not accurate. The scalar (918) is "0," indicating that the issue vector (908) was unrelated to the same call as the action vector (910). However, it was known prior to generating the issue vector (908) and the action vector (910) that the respective natural language issue statement (900) and natural language action statement (902) were related to the same call.

Thus, a loss function (920) is generated. The loss function (920) is used to instruct the respective machine learning models to adjust weights or other parameters. The loss function (920) is determined using the scalar (918).

In this example, the loss function (920) is a binary cross-entropy mathematical function. Recall that for the pair of the issue vector (908) and the action vector (910), one has calculated $\Sigma_i v_s^i * v_a^i$, and after applying the sigmoid gate (916), the scalar (918) was calculated where the scalar (918) is in the range of Y=[0, 1]. Again, the range of Y=[0, 1] represents the probability of the natural language issue statement (900) to be related to the same call as the natural language action statement (902). Additionally, the true value is known of what the scalar (918) should have been in order to reflect the known result. The binary cross-entropy procedure captures the difference between the known result and the calculated scalar (918) by the following formula:

$$L(Y) = Y*\log(Y) + (1-Y)*\log(1-Y),$$

where "L(y)" is the loss function, "Y" is output of the sigmoid gate (916) (i.e., the scalar (918)) in the range of [0, 1], and "log" is the logarithmic mathematical operator.

By mathematically minimizing the loss function, L(Y), one mathematically maximizes the log likelihood of the observed samples by changing the weights defined for the deep learning neural network issue machine learning model (904) and the deep learning neural network action machine learning model (906). As a result, the deep learning neural network issue machine learning model (904) and the deep learning neural network action machine learning model (906) are modified.

At this point, the procedure described above is iterated. The iteration continues until the scalar (918) reaches the value of "1," which matches the known result. Once the calculated estimation matches the known result, the convergence occurs.

Convergence is shown at issue machine learning model convergence (922A) and at action machine learning model convergence (922B). Convergence at issue machine learning model convergence (922A) and action machine learning model convergence (922B) simply means that the iterative process of training has stopped.

Note that convergence may also occur after a pre-defined number of training attempts. For example, for real, complex training of the deep learning neural network issue machine learning model (904) and the deep learning neural network action machine learning model (906), convergence may not be as straightforward as matching all known results. For example, for many different action statements and issue statements being embedded simultaneously, it is unlikely that all predictions will match the known results regardless of the number of times the training is iterated.

In any case, after convergence, the deep learning neural network issue machine learning model (904) has effectively been transformed into the trained issue machine learning model (924). Likewise, the deep learning neural network action machine learning model (906) has been effectively transformed into the trained action machine learning model (926). Note that the trained issue machine learning model (924) and the trained action machine learning model (926) are still deep learning neural networks. However, the weights and possibly other mathematical functions have been altered relative to the initial and final trained machine learning models. Thus, the trained issue machine learning model (924) and the trained action machine learning model (926) are structurally different than the initial deep learning neural network issue machine learning model (904) and the initial deep learning neural network action machine learning model (906).

Figure 10:
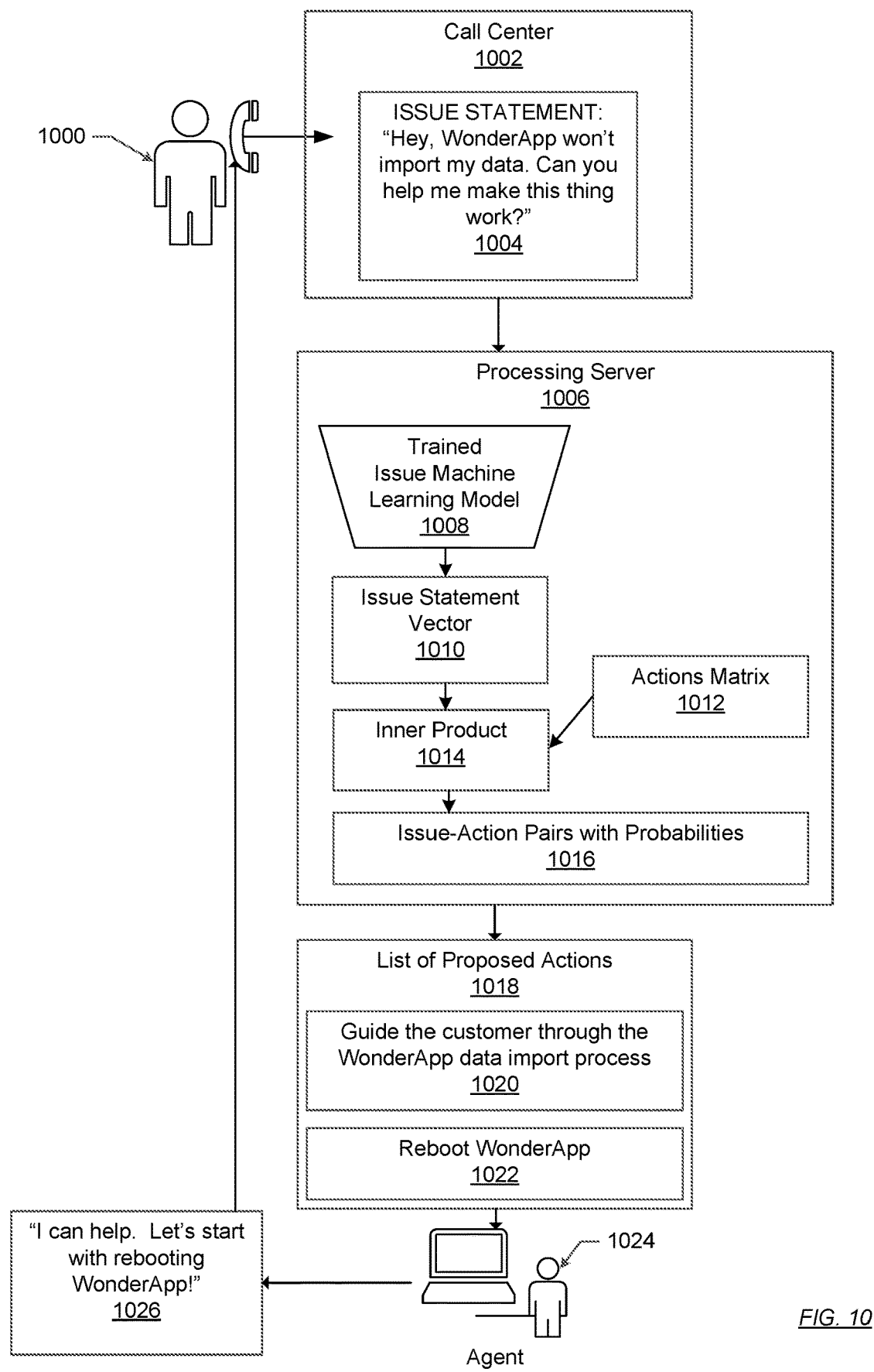
FIG. 10 shows an example of using a machine learning model, in accordance with one or more embodiments of the invention.

FIG. 10 is an example of the trained issue machine learning model in use. The example of FIG. 10 assumes that the natural language issue statement (1004) has been pre-processed for input into the trained issue machine learning model (1008), as described in FIG. 7 and FIG. 8. The example of FIG. 10 also assumes that the actions matrix (1012) has already been generated via use of the trained action machine learning model, as shown in FIG. 3.

In the example of FIG. 10, a user (1000) places a telephone call to a call center (1002). The user (1000) is looking for help with importing data into WonderApp, which is produced and maintained by the same company that maintains the call center (1002). The data repository (100) makes the following issue statement (1004): "Hey, WonderApp won't import my data. Can you help me make this thing work?" It is assumed that the issue statement (1004) is digitized via a speech recognition process.

The processing server (1006) receives the issue statement (1004) in a digital form. The issue statement (1004), digitized and possibly truncated into words, is provided as input to the trained issue machine learning model (1008). The trained issue machine learning model (1008) embeds the issue statement into an issue statement vector (1010). Thereafter, the issue statement vector (1010) and the actions matrix (1012) are multiplied using linear algebra (matrix multiplication) in order to find the inner product (1014) of the two matrices. The result of the inner product (1014) are issue-action pairs with probabilities (1016). The probabilities reflect an estimation of the chances that a given action in the actions matrix (1012) is relevant to the issue statement vector (1010).

The probabilities of the issue-action pairs with probabilities (1016) are then compared to a threshold value. In this example, two action statements in the actions matrix (1012) are deemed to have a sufficiently high probability to be added to a list of proposed actions (1018). Thus, the list of proposed actions (1018) shows a first proposed action (1020) and a second proposed action (1022). The first proposed action (1020) is to "guide the customer through the WonderApp data import process." The second proposed action (1022) is to "reboot WonderApp."

In this particular example, the list of proposed actions (1018) is presented to the agent (1024). The agent (1024) is responsible for selecting from among the list of proposed actions (1018), or perhaps the agent (1024) could reject both of the first proposed action (1020) and the second proposed action (1022) in favor of some other action conceived by the agent (1024).

In this particular example, the agent (1024) believes that this particular issue is most likely to be mitigated by rebooting WonderApp. Thus, the selected action (1026) is the second proposed action (1022), and so the agent (1024) responds to the user (1000) by stating, "I can help. Let's start with rebooting WonderApp!" In this example, the user (1000) follows the advice of the agent (1024), and the user (1000) reports back that the issue has been resolved and that the user (1000) is satisfied.

Note that the agent (1024) could be replaced by a chat bot. Thus, for example, if the call center (1002) is a chat service, the agent (1024) could instead be a chat bot that automatically selects the selected action (1026) from the list of proposed actions (1018) as the issue-action pair with the highest probability.

Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be used improved by including the features and elements described in the disclosure.

Figure 11A:
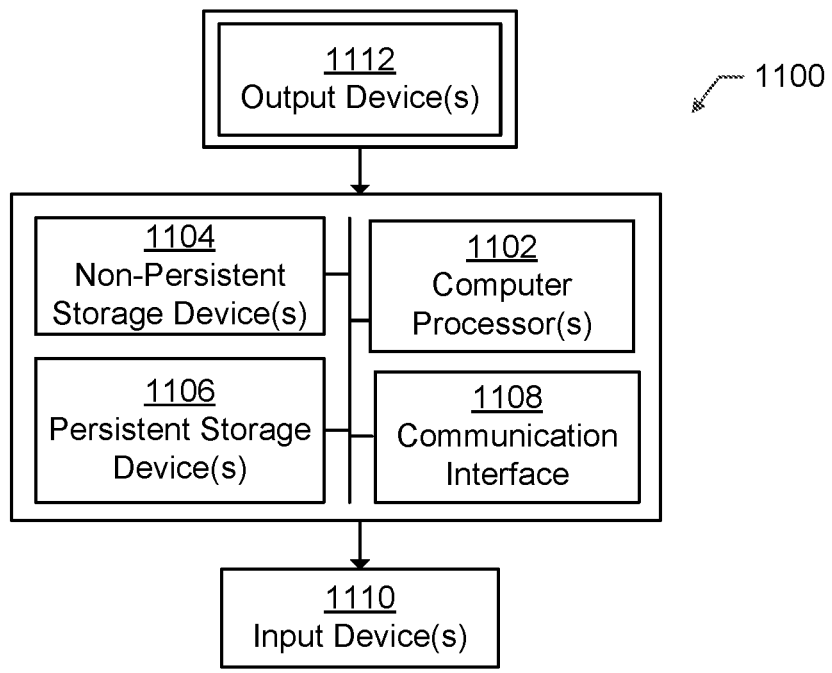
FIG. 11A and FIG. 11B show a computing system, in accordance with one or more embodiments of the invention.

For example, as shown in FIG. 11A, the computing system (1100) may include one or more computer processors (1102), non-persistent storage (1104) (e.g., volatile memory, such as random access memory (RAM), cache memory), persistent storage (1106) (e.g., a hard disk, an optical drive such as a compact disk (CD) drive or digital versatile disk (DVD) drive, a flash memory, etc.), a communication interface (1112) (e.g., Bluetooth interface, infrared interface, network interface, optical interface, etc.), and numerous other elements and functionalities that implement the features and elements of the disclosure.

The computer processor(s) (1102) may be an integrated circuit for processing instructions. For example, the computer processor(s) (1102) may be one or more cores or micro-cores of a processor. The computing system (1100) may also include one or more input devices (1110), such as a touchscreen, keyboard, mouse, microphone, touchpad, electronic pen, or any other type of input device.

The communication interface (1108) may include an integrated circuit for connecting the computing system (1100) to a network (not shown) (e.g., a local area network (LAN), a wide area network (WAN) such as the Internet, mobile network, or any other type of network) and/or to another device, such as another computing device.

Further, the computing system (1100) may include one or more output devices (1112), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1102), non-persistent storage device(s) (1104), and persistent storage device(s) (1106). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 11B:
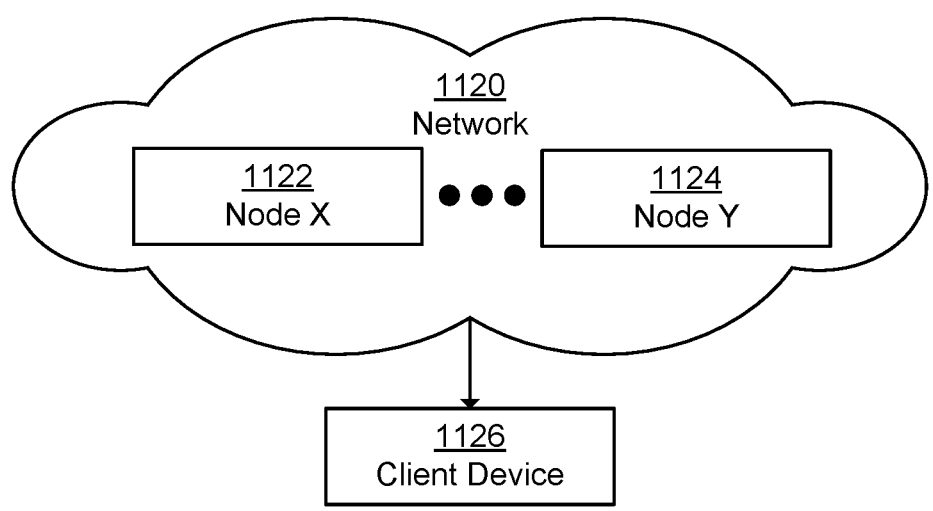

The computing system (1100) in FIG. 11A may be connected to or be a part of a network. For example, as shown in FIG. 11B, the network (1120) may include multiple nodes (e.g., node X (1122), node Y (1124)). Each node may correspond to a computing system, such as the computing system (1100) shown in FIG. 11A, or a group of nodes combined may correspond to the computing system (1100) shown in FIG. 11A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (1100) may be located at a remote location and connected to the other elements over a network.

Although not shown in FIG. 11B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1122), node Y (1124)) in the network (1120) may be configured to provide services for a client device (1126). For example, the nodes may be part of a cloud computing system. The nodes may include functionality to receive requests from the client device (1126) and transmit responses to the client device (1126). The client device (1126) may be a computing system, such as the computing system (1100) shown in FIG. 11A. Further, the client device (1126) may include and/or perform all or a portion of one or more embodiments of the invention.

The computing system (1100) or group of computing systems described in FIGS. 11A and 11B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system (1100) performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system (1100), in performing one or more embodiments of the invention, may extract one or more data items from the obtained data. For example, the extraction may be performed as follows by the computing system (1100) in FIG. 11A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system (1100). For example, the computing system (1100) of FIG. 11A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (1100) in FIG. 11A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data container (database, table, record, column, view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (1100) of FIG. 11A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system (1100). For example, data may be presented to a user using a vibration generated by a handheld computer device with a predefined duration and intensity of the vibration to communicate the data.

The above description of functions presents only a few examples of functions performed by the computing system (1100) of FIG. 11A and the nodes and/or client device in FIG. 11B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of using a trained issue machine learning model (MLM), comprising:
embedding, by the trained issue MLM, a new natural language issue statement into an issue vector, wherein the trained issue MLM is trained using a plurality of prior natural language issue statements associated with ones of a plurality of prior natural language action statements;
receiving an output of a trained action MLM which embedded the plurality of prior natural language action statements by embedding a plurality of prior actions expressed in the prior natural language action statements,
wherein the trained action MLM and the trained issue MLM were trained concurrently by providing an inner product of a first output of the trained action MLM and a second output of the trained issue MLM to a sigmoid gate, using a third output of the sigmoid gate to generate a loss function, and using the loss function to train both the trained issue MLM and the trained action MLM;
calculating, using a clustering method, an actions matrix from the output of the trained action MLM, wherein the actions matrix comprises a plurality of centroid vectors;
calculating an inner product of the issue vector with the actions matrix,
wherein calculating the inner product results in a plurality of probabilities associated with the plurality of prior actions, and
wherein each of the plurality of probabilities represents a corresponding estimate that a corresponding prior action is relevant to the issue vector;
generating a list of proposed actions relevant to the issue vector by comparing the plurality of probabilities to a threshold value and selecting a subset of the plurality of prior actions with corresponding probabilities above the threshold value; and
transmitting, to a user device, the list of proposed actions.

2. The method of claim 1, further comprising:
receiving a call from a user via a call service; and
performing speech recognition to convert words spoken by the user into the new natural language issue statement.

3. The method of claim 1, further comprising generating the actions matrix by:
clustering individual call summaries of prior calls stored as an actions vector into a plurality of centroid vectors.

4. The method of claim 3, wherein generating the actions matrix further comprises:
storing the plurality of centroid vectors as the actions matrix, wherein each row of the actions matrix corresponds to one of a plurality of available actions expressed in natural language.

5. The method of claim 1, wherein calculating the inner product forms a result comprising the plurality of probabilities associated with the plurality of prior actions, and wherein the method further comprises:
prior to generating the list of proposed actions, applying a sigmoid gate function to the result to form a modified result having modified probabilities, and
wherein the modified probabilities are compared to the threshold value when generating the list of proposed actions.

6. The method of claim 5, further comprising:
displaying, on a display device, additional detail regarding an action selected from the list of proposed actions.

7. The method of claim 1, further comprising:
ordering the list of proposed actions from highest probability to lowest probability.

8. The method of claim 1, wherein:
embedding the new natural language issue statement into the issue vector embeds the new natural language issue statement into a first vector space; and
the prior natural language issue statements are embedded in the first vector space.

9. The method of claim 8, wherein the trained issue MLM is trained to embed new natural language issue statements into a new vector in the first vector space.

10. The method of claim 8, wherein:
the prior natural language action statements comprise call summaries; and
the trained action MLM is trained to encode the call summaries in the first vector space.

11. The method of claim 10, wherein:
the plurality of centroid vectors represent clusters of multiple individual call summaries.

12. The method of claim 11, wherein:
each row of the actions matrix corresponds to one of a plurality of available actions expressed in natural language.

13. A system comprising:
a data repository storing:
a new natural language issue statement,
a trained issue machine learning model (MLM), wherein the trained issue MLM is trained using a plurality of prior natural language issue statements associated with ones of a plurality of prior natural language action statements,
an issue vector comprising an embedded version of the new natural language issue statement,
an actions matrix comprising a plurality of centroid vectors calculated using a clustering method from a second output of a trained action MLM applied to a plurality of prior actions taken as a result of prior natural language issue statements,
wherein the trained action MLM and the trained issue MLM were trained concurrently by providing an inner product of a first output of the trained action MLM and a second output of the trained issue MLM to a sigmoid gate, using a third output of the sigmoid gate to generate a loss function, and using the loss function to train both the trained issue MLM and the trained action MLM,
a plurality of probabilities associated with the plurality of prior actions, wherein each of the plurality of probabilities represents a corresponding estimate that a corresponding prior action is relevant to the issue vector,
a threshold value,
a subset of the plurality of prior actions having probabilities above the threshold value, and
a list of proposed actions relevant to the issue vector;
a machine learning execution engine, wherein the machine learning execution engine is configured to:
embed, by the trained issue MLM, the new natural language issue statement into the issue vector,
receiving an output of a trained action MLM which embedded the plurality of prior natural language action statements by embedding a plurality of prior actions expressed in the prior natural language action statements,
calculating, using a clustering method, an actions matrix from the output of the trained action MLM, wherein the actions matrix comprises a plurality of centroid vectors, and
calculate an inner product of the issue vector and the actions matrix to form the plurality of probabilities; and
an action selection engine executable by a processor to:
compare the plurality of probabilities to the threshold value,
select the subset of the plurality of prior actions with corresponding probabilities above the threshold value, wherein selecting the subset forms a list of proposed actions, and
transmit the list of proposed actions to a user device.

14. The system of claim 13, wherein the data repository further stores individual call summaries of prior calls stored as an actions vector, and wherein the system further comprises:
an actions matrix generator configured to:
cluster the individual call summaries into a plurality of centroid vectors, and store the plurality of centroid vectors as the actions matrix, wherein each row of the actions matrix corresponds to one of a plurality of available actions expressed in natural language.

15. The system of claim 13, further comprising:
a speech recognition engine configured to:
receive a call from a user via a call service, and convert speech of the user into the new natural language issue statement.

16. The system of claim 13, wherein the trained issue MLM comprises a deep learning neural network.

17. The system of claim 13, further comprising:
the user device, wherein the user device is remote from the data repository, the machine learning execution engine, and the action selection engine.

18. The system of claim 17, further comprising:
a display device operably connected to the user device, wherein the display device is configured to display the list of proposed actions; and
a user input device operably connected to the user device, wherein the user input device is configured to receive user input comprising a selection of one of the list of proposed actions.

19. The system of claim 13, wherein:
the machine learning execution engine, in being configured to embed the new natural language issue statement into the issue vector, is configured to embed the new natural language issue statement into a first vector space;
the prior natural language issue statements are embedded in the first vector space; and
the trained issue MLM is trained to embed new natural language issue statements into a new vector in the first vector space.

20. The system of claim 19, wherein:
the prior natural language action statements comprise call summaries;
the trained action MLM is trained to encode the call summaries in the first vector space; and
the plurality of centroid vectors represent clusters of multiple individual call summaries.

\* \* \* \* \*